United States Patent [19]

Mori

[11] Patent Number: 4,612,726

[45] Date of Patent: Sep. 23, 1986

[54] PLANT CULTIVATING DEVICE

[76] Inventor: Kei Mori, 3-16-3-501, Kaminoge, Setagaya-ku, Tokyo, Japan

[21] Appl. No.: 693,496

[22] Filed: Jan. 22, 1985

[30] Foreign Application Priority Data

Jan. 27, 1984 [JP] Japan .................................. 59-14113

[51] Int. Cl.$^4$ .............................................. A01G 9/02
[52] U.S. Cl. .......................................... 47/66; 47/17
[58] Field of Search ................ 47/DIG. 6, 17, 66, 18, 47/1.4; 126/440, 424, 428, 429, 425; 362/35, 145, 217, 220, 269, 270, 275, 285, 367, 372; 220/5 A, 336

[56] References Cited

U.S. PATENT DOCUMENTS

| 312,875 | 2/1885 | Marshall | 220/5 A |
|---|---|---|---|
| 1,504,721 | 8/1924 | Sauvé et al. | 47/17 |
| 2,354,665 | 8/1944 | Church et al. | 362/35 |
| 2,599,162 | 6/1952 | Brown | 220/336 |
| 3,324,593 | 6/1967 | Strasser | 47/65 |
| 3,348,922 | 10/1967 | Bose et al. | 47/17 |
| 3,453,786 | 7/1969 | Rebarchek | 47/17 |
| 3,780,722 | 12/1973 | Swet | 126/451 |
| 4,201,197 | 6/1980 | Dismer | 126/451 |
| 4,441,145 | 4/1984 | Antkowiak | 362/122 |

FOREIGN PATENT DOCUMENTS

| K22524 | 10/1956 | Fed. Rep. of Germany | 47/17 |
|---|---|---|---|
| 66509 | 5/1950 | Netherlands | 47/17 |
| 914004 | 3/1982 | U.S.S.R. | 47/DIG. 6 |
| 1047449 | 10/1983 | U.S.S.R. | 47/DIG. 6 |

Primary Examiner—Robert A. Hafer
Assistant Examiner—Bradley M. Lewis
Attorney, Agent, or Firm—Jordan and Hamburg

[57] ABSTRACT

A plant cultivating device enables plant cultivation by effective use of the floor's dimension at a place of high cost per unit dimension of the floor on the building erected in the urban district.

The plant cultivating device comprises a cylinder and an upper plate for covering the upper portion of said cylinder. The cylinder being constructed by combining two side plates, the side surface of which is unitarily formed. The upper plate being constructed with transparent material.

11 Claims, 10 Drawing Figures

FIG.5
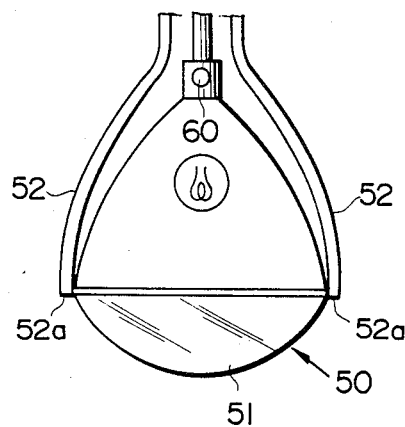
FIG.6
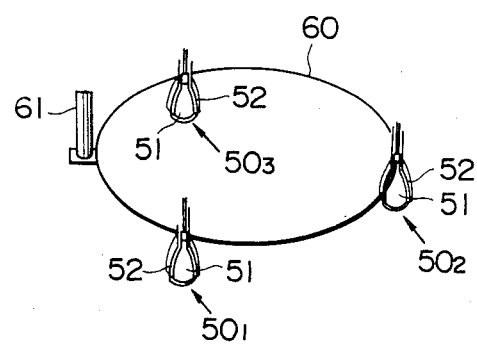
FIG.7a  FIG.7b
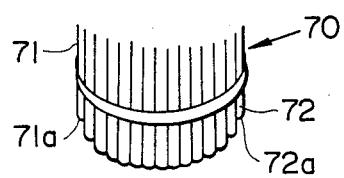 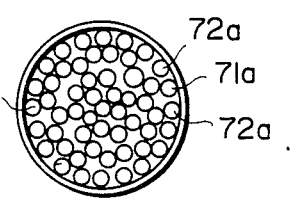

PLANT CULTIVATING DEVICE

BACKGROUND OF THE INVENTION

The present invention relates to a plant cultivating device, in particular, a plant cultivating device which enables plant cultivation by efficient use of floor space in an expensive building erected in an urban district.

A proper amount of nutrients and proper atmospheric conditions such as carbon-dioxide ($CO_2$), water, temperature and humidity, etc. are needed in order to effectively nurture plants. However, it is often difficult to obtain all of these at one time. The ground needs to be prepared for nurturing plants. However, it is not easy to acquire space or ground for cultivating plants in urban districts.

In order to solve such a problem, the present applicant previously proposed a method or an apparatus in which solar rays were focused by a lense or the like and guided into an optical conductor and then further guided through the optical conductor onto a plant cultivating device which was installed in an optional desired place for receiving light energy for plants. Furthermore the present applicant has proposed a plant cultivating device in which artificial light rays were employed in addition to solar rays. (Refer to Japanese Patent Application No. 58-119866.)

The plant performs a photosynthesis through the use of light energy given it and delivers or transmits nutritious substances produced by the action of the photosynthesis to its trunk, fruits, etc. Such delivery of transportation can be more effectively carried out when there is no light; there is sufficient oxygen; and there is a low ambient temperature. Therefore, in order to nurture plants, more effectively, it is necessary to cause photosynthesis to occur and then nutrious substances are transmitted to the limbs, trunk, and fruit of the plant. In order to effectively cause photosynthesis to occur and for the subsequent transmission of nutrients to the limbs, trunk and fruits of plant to take place, periods of brightness and darkness must be alternated at predetermined intervals.

Furthermore, in the case of nurturing plants, it may be preferable to supply light rays to the plant intermittently (several $\mu s$ to several ms) instead of continuously. Specifically, the photosynthesis consists of a brightness reaction and a darkness reaction, and intensified light rays are given to the plant during the time period of a brightness reaction while no light rays or rather weakened light rays are given during the time period of a darkness reaction. In such a manner, the growth of the plant is enhanced.

When using a movable light source device, the utilization area of light energy can be increased compared with the use of a fixed light source. Namely, in the case of employing a light source of the same capacity, the plant can be cultivated over a wider area. In addition to that, the shadowed portion created by the leaves of the plant changes every moment in accordance with the afore-mentioned movement of the light source device, so that the brightness reaction and the darkness reaction are effectively alternated. In such a manner, growth of the plant can be much more effectively promoted.

Furthermore, in order to nurture the plant effectively, it is necessary to give it a proper amount of nutritious substances, light rays, water, carbon-dioxide, temperature, and humidity. The plant cultivating tub has to be hermetically-sealed in order to supply carbon-dioxide. By employing such a construction, the plant cultivating tub can be supplied with air containing carbon-dioxide.

Furthermore, in order to cultivate plants more effectively, they need to be provided with a period of brightness and a period of darkness corresponding to day time and night time. Those periods have to be in an order of hours. The brightness period represents the time period for performing a photosynthesis while the darkness period represents the time period for performing a delivery or transportation of nutritious substances from the leaves, to the fruits, and to the trunk. During the brightness period, carbon-dioxide is needed for performing the photosynthesis. On the contrary, oxygen is needed for breathing during the darkness period. Therefore, it may be preferable to supply carbon-dioxide of a comparatively high and adequate temperature and an adequate humidity during the brightness period and to supply oxygen of a comparatively low temperature during the darkness period.

SUMMARY OF THE INVENTION

The primary object of the present invention is to provide a plant cultivating device which can be simply manufactured and assembled and which is of a low-cost and also durable.

Another object of the present invention is to provide a plant cultivating device capable of effectively performing its task.

Still another object of the present invention is to provide a plant cultivating device capable of cultivating plants within a narrow space.

BRIEF DESCRIPTION OF THE DRAWINGS

FIGS. 5 through 7 are views showing embodiments of the light source device, respectively;

DESCRIPTION OF THE PREFERRED EMBODIMENTS

Figure 1:
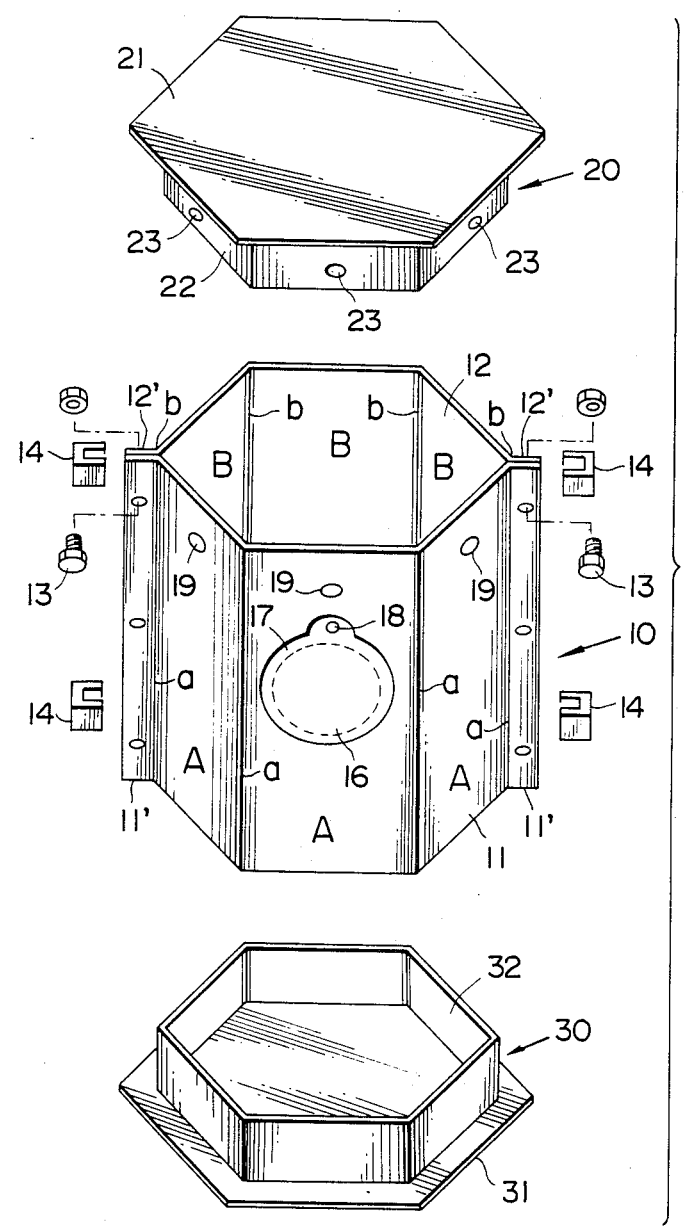
FIG. 1 is an analytical view for explaining an embodiment of a plant cultivating device according to the present invention.

FIG. 1 is a breakdown view for showing an embodiment of a plant cultivating device according to the present invention. In FIG. 1, 1 is a plant cultivating device according to the present invention. Basically the plant cultivating device container or tub 1 is air-tightly constructed by combining a hexagonal cylinder 10, an upper cover 20 and a plant cultivating floor 30. The plants to be cultivated are arranged within the inner portion of the plant cultivating device.

In the present invention, the hexagonal cylinder 10 is constructed by combining the flanges 11' and 12' of two side plates 11 and 12 consisting of a side plate having unitarily three-sided surfaces A and another side plate having, unitarily, three-sided surfaces B respectively by means of bolts 13 or fixed members 14 in the shape of shown in FIG. 1. In such a manner, the manufacturing and assembling of the hexagonal cylinder are very easy. In addition, the cost can be greatly reduced and it can be made in a strong and durable way. Namely, the side plates 11 and 12 are preferably constructed with artificial resin such as plastic or the like. Those plates 11 and 12 can be easily formed with press-processing operation including, heating the bent portions a and b of the plates. It is preferable to construct those plates 11 and 12 using transparent plastic. A part of the plates is formed as a reflection surface. For instance, as shown in FIG. 1, leaving out only the portion 16 of the side plate 11, the inner surface or the outer surface of the side plate 11 is formed as a reflecting surface by performing evaporation treatment with a metal such as aluminium. As is described hereinafter, the light rays guided into the hexagonal cylinder are reflected on the reflecting surface and are effectively supplied to the plants which are accommodated in the hexagonal cylinder for the purpose of effectively promoting the photosynthesis of the plants.

Furthermore, the above-mentioned portion 16 is notched in order to form a window hole. The extent of the plant growth in the hexagonal cylinder can be observed through the window hole portion 16. Otherwise, fruits, or the like, to be harvested can be taken out through the window hole portion 16.

As mentioned before, the plants can be much more effectively nurtured by alternating brightness periods and darkness periods at certain time intervals. However, the light rays guided into the hexagonal cylinder leak outside through the window hole portion 16 and therefore the utilization efficiency thereof decreases during the brightness period while the external light rays are guided into the hexagonal cylinder from outside through the window hole portion 16 during the darkness period so that the cultivation of nurtured plants is obstructed. In order to avoid such problems, a cover plate 17 is set up at the external side of the window hole portion 16, and it can be opened and shut freely. The internal surface of the cover plate 17 is formed as a reflecting surface and the cover 17 can be freely rotated around a pin 18. By use of such a design, opening and closing the window hole portion 16 can be easily done.

An example of converting the transparent side plates 11 and 12 into reflecting surfaces by performing metal evaporation on the internal or external sides of them has already been described. Instead, a cover plate having an internal side formed as a reflecting surface can be removably mounted on the external side of the hexagonal cylinder without performing reflection-film processing as mentioned above on the transparent side plate. In such a manner, by removing the cover plate, the plants in the hexagonal cylinder can be observed. On that occasion, if the cover plate is removably mounted on the respective side surfaces, the plants in the hexagonal cylinder can be observed from an optional desired place.

The construction of the side plates 11 and 12 for making the hexagonal cylinder 10 with a transparent substance has been described heretofore. However, it is not always necessary to construct the side plates 11 and 12 with a transparent substance. Those plates can be constructed with an opaque substance. In the case of constructing the side plates 11 and 12 with an opaque substance, the inner surface of the side plate is formed as a reflecting surface. Only the case of a hexagonal cylinder has been described thus for, but the present invention is not limited to that embodiment. For example, square cylinders, triangular cylinders, and round cylinders can be used also.

The upper cover 20 consists of a transparent upper cover 21 and a hexagonal cylinder 22 which are unitarily attached to the lower side of the upper cover 21. When the side plates 11 and 12 are unitarily combined by use of bolts or the like as mentioned above, the outer circumferential surface of the hexagonal cylinder 22 and the inner circumferential surface of the side plates 11 and 12 are tightly brought into contact with each other so as to make it air-tight between them. On that occasion, if a packing or the like is inserted between the hexagonal cylinder 22 and the side plates 11 and 12, more reliable air-tightness can be obtained.

The upper cover plate 21 is constructed with a transparent substance, according to the present invention, as mentioned above, for the purpose of guiding the light rays from the upper side of the transparent plate 11 into the hexagonal plant cultivating tub 10 through the transparent plate 11. The method of guiding the light rays is described below.

As shown in the perspective view of a side plate 11 in FIG. 1, at least one side surface of the hexagonal cylinder 22 of the upper cover portion 20 has a hole 23 bored therein, which corresponds to a hole 19 bored in the upper portion of the side plate 11. The upper cover portion 20 is fixedly mounted on the hexagonal cylinder 10 by means of the bolts passing through those holes. When the side plate 12 is removed at the time of taking care of the plants accommodated in the cylinder, the upper cover portion 20 is fixed on the upper portion of the side plate 11.

The plant cultivating floor 30 consists of a bottom plate 31 and a hexagonal cylinder 32 which are unitarily mounted on the upper portion of the bottom plate 31. As is the case of the afore-mentioned upper cover portion, when the side plates 11 and 12 are combined into one by means of the bolts 13 or fixed members, the outer circumferential surface of the hexagonal cylinder 32 tightly comes into contact with the inner circumferential surfaces of the side plates 11 and 12 in order to make it air-tight between them. As a result, the air-tightness between them can be made much more reliable by inserting packing between the hexagonal cylinder 32 and the side plates 11 and 12.

Under such circumstances it may be possible to raise the plants directly in the hexagonal cylinder 32 of the plant cultivating floor 30. Otherwise, it may be also possible to put one or more plant cultivating floor containers in the hexagonal cylinder 32. In such a manner, the plants to be cultivated can be freely taken in or taken out or exchanged for others.

Figure 2:
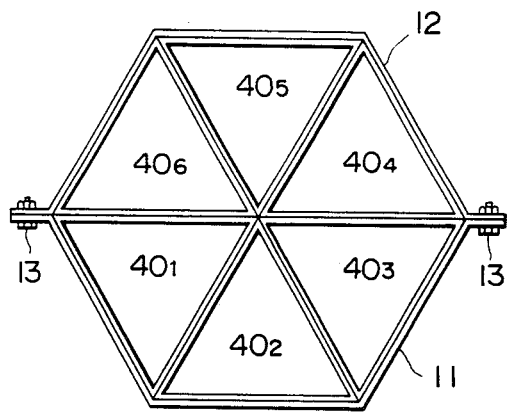
FIGS. 2 and 3 are plane views showing embodiments of the plant cultivating floor container preferably employed for embodying the present invention.

Furthermore, instead of the plant cultivating floor 30 as mentioned above, six triangular plant cultivating floor containers ($40_1 \sim 40_6$) are prepared as shown in FIG. 2. Those containers can be arranged by combining them in the shape of a hexagon and two side plates 11 and 12 can cover the external side of the hexagonal body. In such a manner, when each plant cultivating floor container is taken in or taken out, it may be possible to put in or take out the container by moving it in a horizontal direction. Therefore, the plant cultivating floor container can be put in or taken out without any mutual interference between the neighboring plant cultivating floor containers.

However in such a case six plant cultivating floor containers are always needed. For instance, when one of the plant cultivating floor containers is taken out, the other plant cultivating floor container is put in its place. Namely, six containers always need to be used. In such a construction, air-tightness can be maintained at the lower portion of the plant cultivating tub.

In the embodiment shown in FIG. 2, if the packing or the like which is put in between the respective containers or between the respective containers and the side plates, air-tightness therebetween can be maintained more reliably. However, airtightness inside the plant cultivating tub is not consistent. As the case may be, if air-tightness is sufficient to keep the humidity constant inside the plant cultivating tub, it may be acceptable.

Figure 3:
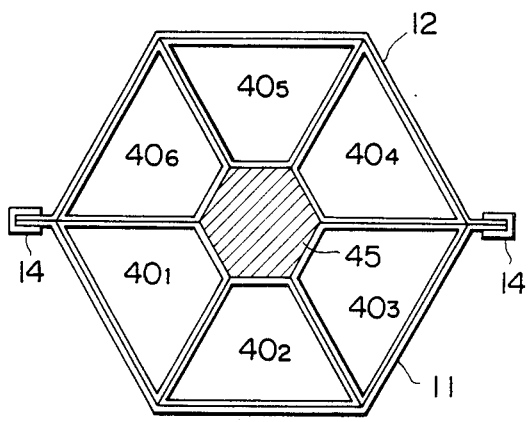

Otherwise, if one of the end portions of the triangular floor containers is cut off as shown in FIG. 3 and six triangular floor containers are arranged so as to have the cut-off portions at the center, a space in the shape of a hexagon is created there, A hexagonal cylinder 45 is arranged in the space and a packing or the like is put between the cut-off portion of each floor container and the hexagonal cylinder 45 for the purpose of keeping them air-tight.

Furthermore, it may be possible also to elongate the hexagonal cylinder 45 to the upper cover 20 and to support the upper cover 20 by the upper edge portion of the hexagonal cylinder 45. Furthermore it may be possible also to set up a supporting pole for supporting the trunk or the branches that are on the hexagonal cylinder 45. Otherwise, it may be possible that one of the tip end portions of the triangular floor containers is cut off in the shape of a circular arc and a circular cylinder is employed instead of a hexagonal cylinder 45.

An embodiment of the plant cultivating tub according to the present invention has been described heretofore. The plant cultivating tub explained here can be effectively used even though a single plant cultivating tub is used in the device. However, especially in the case of a square cylinder or a hexagonal cylinder, a large number of plant cultivating tubs can be arranged in a narrower space and can be much more effectively used.

Figure 4:
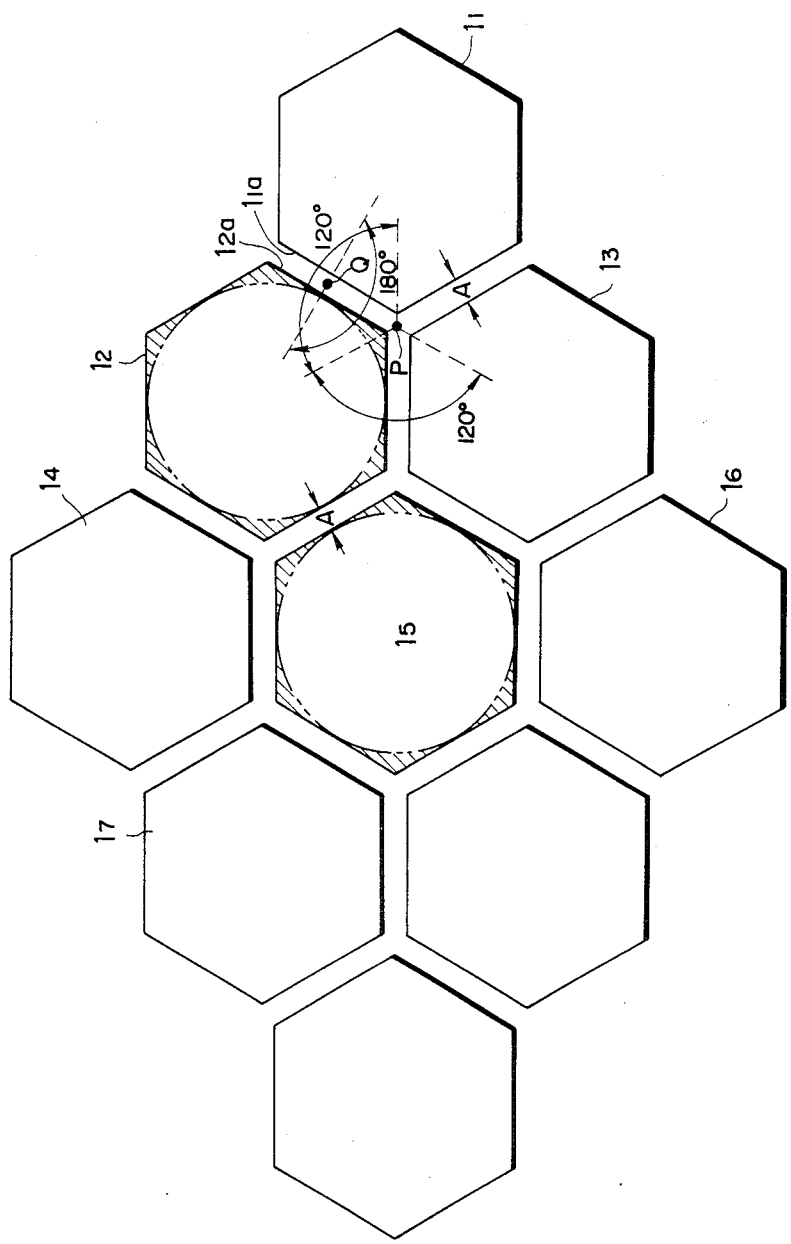
FIG. 4 is a plane view showing the floor containers according to the present invention in the case of arranging a large number of plant cultivating tubs.

FIG. 4 is a plane view showing the floor containers according to the present invention as in the case of arranging a large number of plant cultivating tubs in the shape of a hexagonal cylinder. In FIG. 4, $1_1, 1_2, 1_3, \ldots$ are the plant cultivating tubs corresponding to the plant cultivating tub 1 shown in FIG. 1. Those plant cultivating tubs are constructed in the shape of a hexagon, a square, or a cylinder. Therefore, if the respective tubs are arranged so as to let each side be opposite to the other as shown in FIG. 4, useless space can be reduced to a minimum and the plant cultivating tubs can be most effectively arranged. Especially, the plant cultivating device is effective in the case of employing it in an urban district where the cost of floor space is high.

Furthermore, in order to observe growth conditions of the plants accommodated in the respective plant cultivating tubs, it is necessary to provide passages between the plant cultivating tubs. In such cases the passage width A needs to be the width of a person. According to the present invention, the passage width A is nearly constant and needs only a minimum of space. For instance, in the case of constructing the plant cultivating tub in the shape of a circular cylinder, each plant cultivating tub is the one as shown by a two-dots-and-a-dash line. The distance between the neighboring two tubs is A at the nearest position, and larger than A in the other area. Namely, excessive space as shown in the hatched area of FIG. 4 increases and therefore the efficient utilization of floor space is lessened.

As mentioned above, the plant cultivating tub according to the present invention has a window hole portion 16 for observing the growth condition of the plants accommodated in the plant cultivating tub, or for taking care of the plants, or for harvesting the fruits therefrom. The light rays enter the plant cultivating tub through the window hole 16 or leak outside from the tub therethrough. There is a fear that the light rays leaking through the window hole portion of one plant cultivating tub is guided into the other neighboring plant cultivating tub through the window hole thereof. For this reason, it is necessary to arrange the respective neighboring plant cultivating tubs in such a manner that the window hole portions are not opposite to each other.

For example, in the neighboring two plant cultivating tubs $1_1$ and $1_2$, the tub $1_1$ has a window hole portion at its side surface $1_1a$ and the tub $1_2$ has a window hole portion at its side surface $1_2a$ opposed to the side surface $1_1a$ of the tub $1_1$. If the plant cultivating tub $1_1$ is in the brightness period and the plant cultivating tub $1_2$ is in the darkness period, when the window hole portions of both plant cultivating tubs are opened the light rays leaking through the window hole portion of tub $1_1$ are guided into tub $1_2$ through the window hole portion of tub $1_2$ and the plants accommodated in tub $1_2$ in the darkness period are supplied with light rays, and as a result the growth of the plants in tub $1_2$ is hindered. In order to avoid such an obstacle, the window hole portion of tub $1_1$ or $1_2$ is provided at the side surface except for the afore-mentioned side surface. Namely, it is arranged so as to avoid being opposite to each other.

FIG. 5 is a side view for explaining an embodiment of the light source device supplying light energy for causing photosynthesis to the plants accommodated in the plant cultivating tub as mentioned above. In FIG. 5, the light source device 50 consists of a light source (an electric bulb) 51 for generating an artifical light and an optical conductor 52 to which the solar rays collected by the solar ray collecting device, not shown in the drawings, are transmitted therefrom. The edge portion (not shown in the drawings) of the optical conductor 52 is positioned at the focal point of the lense for focusing the solar rays, and the solar rays focused by the lense are guided into the optical conductor 52 and propagated through the optical conductor 52 and finally are emitted from the edge portion 52a, as previously proposed in various ways by the present applicant.

In the case of nurturing plants, growth of the plants is promoted better by intermittently supplying the light rays to the plants than in continuously supplying the light rays thereto, as mentioned heretofore. When the light source device is moved, the area shadowed by the preceding leaves changes every moment in accordance with the movement of the light source device. In consequence, the brightness reaction and the darkness reaction are effectively repeated.

Further, as mentioned above, the controlled repetition of brightness periods and darkness periods enables the promotion of plant growth. For this reason, a single light source can be employed by changing it from one plant cultivating tub to an other.

Consequently, in the case of changing the single light source device from one plant cultivating tub $1_1$ to the other plant cultivating tub $1_2$, the light source device is moved onto the plant cultivating tub $1_1$ and supplies the light rays to the plants accommodated in the plant cultivating tub $1_1$ during a predetermined time period. On the other hand, the light rays are not supplied to the plants accommodated in the plant cultivating tub $1_2$ during that same period. After the predetermined time period has elapsed, the light source device is moved onto the plant cultivating tub $1_2$ and supplied the light rays to the plants accommodated in the plant cultivating tub $1_2$. The performance as mentioned above is intermittently repeated thereafter. On that occasion, if the light source device effectively creates a brightness reaction and a darkness reaction to the plants in the plant cultivating tubs $1_1$ and $1_2$, growth of the plant is effectively promoted. Solar rays are preferable for nurturing plants. However, since solar rays cannot be utilized at night or on cloudy days, a combination of solar rays with artifical light rays is needed to effectively promote the growth of the plants. In respect to that matter, the present applicant has already proposed the same kind of device in various ways.

FIG. 6 is a perspective view showing an embodiment of the light source device preferably employed in the case of arranging a large number of plant cultivating tubs as mentioned above. The light source device has a plurality of light source portions $50_1$, $50_2$, $50_3$. (Those are the same in construction as the light source device 50 shown in FIG. 5.) Those light source portions are mounted on a single arm 60 and the respective light source portions $50_1 \sim 50_3$ are arranged, for instance, on a single plant cultivating tub. For example, those light source portions can move or be moved around the shaft 61.

Furthermore, the arm 60 is mounted on the shaft 61 so as to rotate around it. When the shaft 61 is set up at point P shown in FIG. 4, the light source device can be alternately employed on the plant cultivating tubs $I_1$, $I_2$ and $I_3$ by rotating the shaft 61 in the angle area of 240°. When the shaft 61 is set up at point Q shown in FIG. 4, the light source device can be alternately employed on the plant cultivating tubs $I_1$ and $I_2$ by rotating the shaft 61 by 180°. For instance, after supplying the light rays to the plants in the plant cultivating tub $1_1$ for a predetermined time period, the shaft 61 is rotated by 120° or 180°. At this time, the plant cultivating tub $1_1$ supplied with light rays until then is no longer supplied with them. Instead, the light rays are supplied to the plant cultivating tub $1_2$ newly arranged under the light source portions $50_1 \sim 50_3$. In the case of setting up the shaft 61 at point P the light source device is alternately employed on the plant cultivating tubs $I_1$, $I_2$ and $I_3$ repeatedly for a predetermined time period, while in the case of setting up the shaft 61 on point Q it is also alternately employed on plant cultivating tubs $I_1$ and $I_2$.

The case of commonly employing a plurality of plant cultivating devices by rotating the light source device has been described heretofore. However, it may be easily understood that the light source device can be rotated so as to travel on a plurality of plant cultivating tubs $1_1$, $1_2$, $1_3$, ..., $1_6$, ..., in that order.

The case of constructing the light source device by means of the artificial light source lamp and the light-emitting edge portion of the optical conductor have also been described heretofore. It may also be possible to construct a light source device only by means of the light-emitting edge of the optical conductor.

FIG. 7(a) and 7(b) are views showing the case of constructing a light source device only by the means of the light-emitting edge of the optical conductor. FIG. 7(a) is a side view of the light source device and FIG. 7(b) is an edge-surface view thereof. In FIG. 7, 70 is a light source device, 71 is an optical conductor to which the solar rays are transmitted, and 72 is an optical conductor to which the artificial light rays are transmitted. The light source device 70 is constructed by combining optical conductors 71 and 72. As is well known, each edge portion not shown in the drawings of the optical conductor 71 is arranged at the focal position of the lense for focusing the solar rays, and the solar rays focused by the lense are guided into the optical conductor 71. Each edge portion not shown in the drawings of the optical conductor 72 is arranged at the focal position of the lense for focusing the artifical light rays generated from the artificial light source lamp, and the artificial light rays focused by the lense are guided into the optical conductor 72. In such a manner, the solar rays and the artificial light rays, guided into the respective optical conductors 71 and 72 and propagated therethrough respectively, finally are emitted from the edge portions 71a and 72a respectively.

In FIG. 7, the case of emitting the solar rays and the artificial light rays from different optical conductors has been described. However, it may be possible that the solar rays and the artificial light rays guided into the optical conductors respectively, as mentioned above, are guided into a single optical conductor. The guided light rays propagate through the optical conductor and are emitted from the edge portion of the single optical conductor. In such a manner, even in the case of constructing the light source device only by means of the light-emitting edge of the optical conductor, the light source device can be moved, vibrate or be vibrated just like in the embodiment explained in connection with FIG. 5 and FIG. 6 mentioned above. And further, if the optical conductor is employed, the exchange and switching of the light rays can be easily performed so that the utilization efficiency of the light rays can be greatly improved as will be explained hereinafter.

Figure 8:
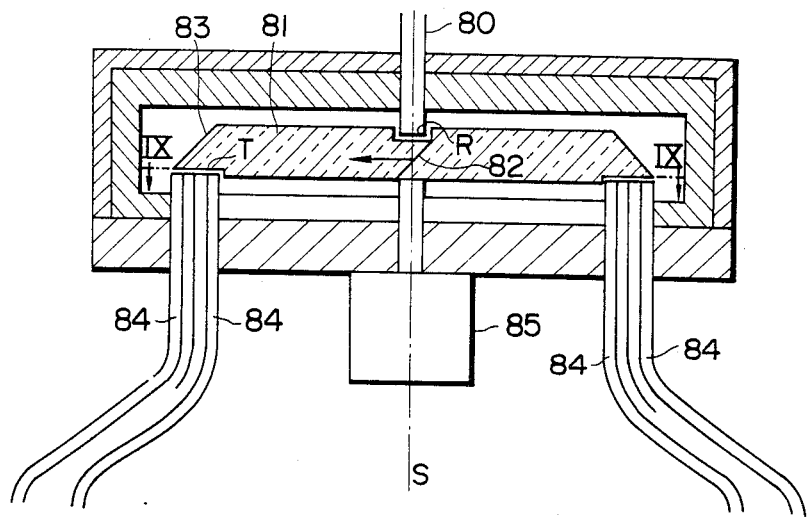
FIGS. 8 and 9 are views for explaining an emobidment of the light switching mechanism.
Figure 9:
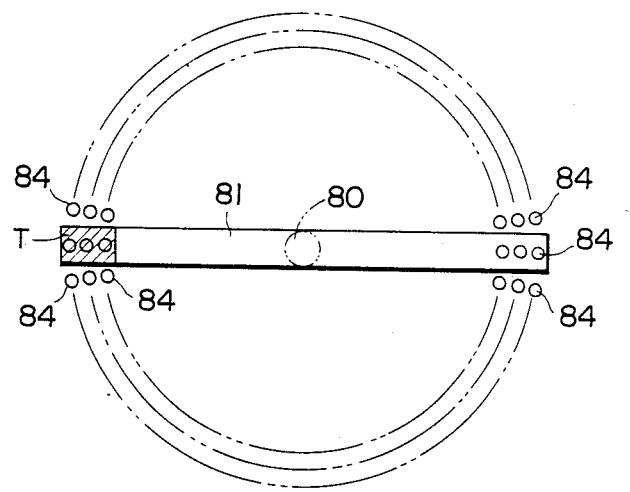

FIGS. 8 and 9 are views for explaining an example case of utilizing the light rays propagating through the optical conductor as mentioned above. The present applicant has already proposed it. (Refer to Japanese Patent Application No. 57-17238.) According to the above-mentioned embodiment, the switching of the light rays can be easily performed so that the brightness reaction and the darkness reaction can be effectively promoted. Namely, in FIGS. 8 and 9, 80 is an optical conductor to which the solar rays and/or the artifical light rays, and 81 is a transparent rotating rod. The light-emitting edge R of the optical conductor 80 is provided so as to be opposite to the rotational center S of the rotating rod 81.

Furthermore, a reflecting mirror 82 is provided at the rotational center S of the rotating rod 81, opposite to the light-emitting edge R of the optical conductor 80. The light rays guided into the rotating rod 81 from the optical conductor 80 are reflected on the reflecting mirror 82 and propagate toward the (circumferential) end portion of the rotating rod 81. The light rays are further reflected on a reflecting mirror 83 provided at the (circumferential) end portion and emitted outside from the rotating rod 81 through a light-emitting surface T. A large number of optical conductors arranged opposite to the light-emitting surface T of the rotating rod 81 are represented by 84. The light-receiving edge surfaces of a large number of optical conductors are arranged in a circular state so as to be opposite to the light-emitting surface T of the rotating rod 81 as shown in FIG. 9.

Consequently, when a motor 85 rotates, the rotating rod 81, the light-receiving surface of the optical conductor 84 opposite to the light-emitting surface T of the rotating rod 81 is exchanged for the other in order and in accordance with the rotation of the rotating rod 81. The light rays are instantaneously supplied once to each optical conductor 84 at every rotation of the rotation rod 81 so that the right rays from the optical conductor rod 84 are switched. In consequence, if the other edge portions each optical conductor 84 are guided into the plant cultivating tub as mentioned before, the light rays are supplied to the plants in the plant cultivating tub, and the photosynthesis, namely, the brightness reaction and the darkness reaction can be effectively performed.

Figure 10:
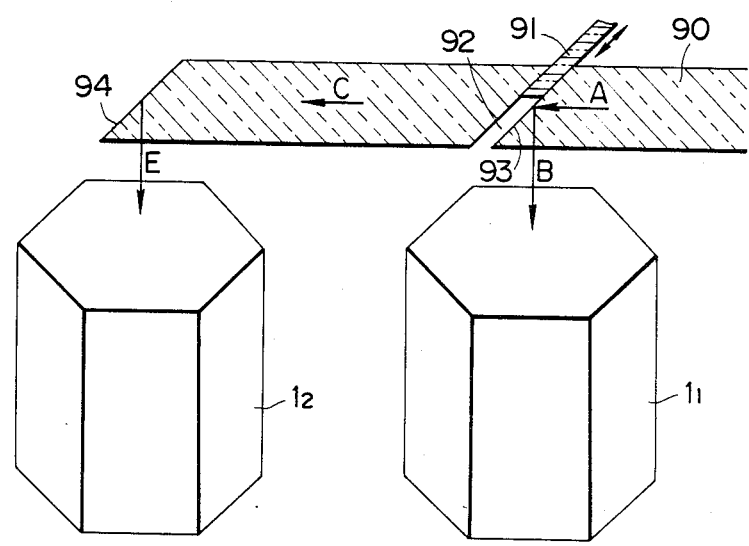
FIG. 10 is a perspective view showing an embodiment of the light switching mechanism.

FIG. 10 is an outlined, perspective view showing an embodiment of the light switch for switching on and switching off the light rays propagating through the optical conductor. The present applicant has already proposed the light switch as mentioned above. By employing such a light switch, as an example, it may be possible to effectively switch the light rays propagating through the optical conductor in such a manner as mentioned before. Therefore, the light rays propagating through the optical conductor can be alternately supplied to either one of two plant cultivating tubs and it may be possible to easily give the brightness period and the darkness period thereto.

In FIG. 10, 90 is an optical conductor and 91 is a transparent plate which can be inserted and removed in a direction crossing the optical conductor 90. The solar rays are transmitted into the optical conductor 90. Supposing that the transparent plate 91 is not inserted into the optical conductor 90, the light rays propagating through the optical conductor 90, in a direction shown by an arrow A, are reflected on the edge surface 93 of the optical conductor 90 neighboring the insertion-removal space portion 92 for inserting and removing the transparent 91 and directed to direction B. When the transparent plate 91 is inserted into the optical conductor 90, the light rays propagate in direction C through the transparent plate 91 and are reflected on the edge portion 94 of the optical conductor 90 and further directed to direction E.

Consequently, for instance, the light rays from the insertion-removal space portion 92 are supplied to the plant cultivating tub $1_1$ and the light rays from the edge portion 94 are supplied to the plant cultivating tub $1_2$. In such a manner, the light rays propagating through the optical conductor 90 can be alternately supplied to plant cultivating tubs $1_1$ and $1_2$ by removing or inserting the transparent plate 91. If such an operation is performed at intervals of a predetermined time period, it may be possible to give effectively the brightness period and the darkness period to the plants in the plant cultivating tubs $1_1$ and $1_2$, respectively.

Moreover, supposing that carbon-dioxide of a comparatively high and adequate temperature and adequate humidity is supplied to the plants during the brightness period and oxygen (air) of comparatively low temperature is supplied thereto during the darkness period, growth of the plant can be further promoted as mentioned before. If carbon-dioxide is exchanged for the other between two plant cultivating tubs in accordance with the brightness period or the darkness period, the utilization efficiency of carbon-dioxide can be improved. Therefore, the piping system is preferably constructed so as to transfer carbon-dioxide in synchronism with the movement of the light source device or the exchange thereof.

Various embodiments of the present invention have been described heretofore. However, the present invention is not limited to the embodiments as mentioned above. For instance, in relation to the afore-mentioned light source device, it may be easily understood that various combinations of the solar rays with artificial light rays are possible except for the combination mentioned above.

As is apparent from the foregoing description, according to the present invention, it may be possible to provide a plant cultivating tub which can be simply manufactured and assembled and is low-cost and durable. Further, it may be possible to provide a plant cultivating tub capable of effectively nurturing plants by effectively using a limited amount of floor space.

What is claimed is:

1. Plant cultivating apparatus comprising a plurality of pairs of upright side plates each made of a transparent material, joining means for joining each of said pairs of side plates to form a plurality of upright hexagonal containers, a transparent upper cover mounted on the top of each of said containers to provide an air-tight seal between said upper cover and the respective container, said upper covers being made of a transparent material, a bottom member means mounted on the bottom of each of said containers to provide an airtight seal between said bottom member means and the respective containers, each of said hexagonal containers having six side walls, said plurality of containers being disposed in spaced array such that a first side wall of a first hexagonal container is disposed in spaced parallel alignment with a first side wall of a second hexagonal container, a second side wall of said first hexagonal container is disposed in spaced parallel alignment with a first side wall of a third hexagonal container, and a second side wall of said second hexagonal container is disposed in spaced parallel alignment with a second side wall of said third hexagonal container to thereby form a space between said first, second and third hexagonal containers having a generally Y-shaped configuration having three leg portions joined at a common center with the angle between each leg portion being 120 degrees, a light source means disposed above said hexagonal containers, said light source means comprising a rotatable shaft, an arm mounted on said rotatable shaft, and at least one light device mounted on said arm for directing light onto said hexagonal containers, said rotatable shaft being disposed upright for rotation about an axis coincident with said common center of said Y-shaped space such that said shaft can be rotated to dispose said arm and said light device in a plurality of rotatable positions to direct light from said light device onto either one of said first, second and third hexagonal containers, whereby said first, second and third hexagonal containers can be selectively exposed to said light from said light device depending on the rotational position of said shaft to thereby provide for controlled repetition of lighted and non-lighted periods in said containers to thereby enhance the promotion of plant growth in said containers.

2. Plant cultivating apparatus according to claim 1, wherein said plurality of containers are disposed in spaced array such that a third side wall of said first hexagonal container is disposed in spaced parallel alignment with a first side wall of a fourth hexagonal container and a third side wall of said third hexagonal container is disposed in spaced parallel alignment with a second side wall of said fourth hexagonal container to thereby form a space between said first, third and fourth hexagonal containers having a generally Y-shaped configuration having three leg portions joined at a common center.

3. Plant cultivating apparatus according to claim 2, wherein one leg portion of said Y-shaped space formed by said first, second and third hexagonal containers is common with one leg portion of said Y-shaped space formed by said first, third and fourth containers.

4. Plant cultivating apparatus according to claim 1, wherein said containers are spaced from one another an equal distance.

5. Plant cultivating apparatus according to claim 2 further comprising window means in at least one side wall of each of said hexagonal containers, said first, second, third and fourth hexagonal containers each having at least one side wall which is not disposed in spaced parallel alignment with any other hexagonal container, said window means being disposed in each of said at least one side walls of said first, second, third and fourth hexagonal containers.

6. Plant cultivating apparatus according to claim 1, wherein said bottom member means comprises a plurality of plant compartments arranged so that individual plant compartments may be removed from said container.

7. Plant cultivating apparatus according to claim 6, wherein there are six of said plant compartments, each of said plant compartments having converging side walls.

8. Plant cultivating apparatus according to claim 7, wherein each of said plant compartments has a triangular configuration.

9. Plant cultivating apparatus comprising a plurality of pairs of upright side plates each made of a transparent material, joining means for joining each of said pairs of side plates to form a plurality of upright hexagonal containers, a transparent upper cover mounted on the top of each of said containers to provide an air-tight seal between said cover and the respective container, said upper covers being made of a transparent material, a bottom member means mounted on the bottom of each of said containers to provide an air-tight seal between said bottom member means and the respective containers, each of said hexagonal containers having six side walls, said plurality of containers being disposed in spaced array such that a first side wall of a first hexagonal container is disposed in spaced parallel alignment with a first side wall of a second hexagonal container, a second side wall of said first hexagonal container is disposed in spaced parallel alignment with a first side wall of a third hexagonal container, and a second side wall of said second hexagonal container is disposed in spaced parallel alignment with a second side wall of said third hexagonal container to thereby form a space between said first, second and third hexagonal containers having a generally Y-shaped configuration having three leg portions joined at a common center with the angle between each leg portion being 120 degrees, a third side wall of said first hexagonal container being disposed in spaced parallel alignment with a first side wall of a fourth hexagonal container and a third side wall of said third hexagonal container being disposed in spaced parallel alignment with a second side wall of said fourth hexagonal container to thereby form a space between said first, third and fourth hexagonal containers having a generally Y-shaped configuration having three leg portions joined at a common center with the angle between each leg portion being 120 degrees, one leg portion of said Y-shaped space formed by said first, second and third hexagonal containers being common with one leg portion formed by said Y-shaped space formed by said first, third and fourth hexagonal containers, and a plurality of light source means extending above said hexagonal containers, said light source means each comprising a rotatable shaft, an arm mounted on said rotatable shaft, and at least one light device mounted on said arm for directing light onto said hexagonal containers, each of said rotatable shafts being disposed upright in said space between said hexagonal containers so that each of said rotatable shafts can be rotated to dispose each arm and its light device in a plurality of rotatable positions such that in one position the light device overlies one hexagonal container to direct the light into said one hexagonal chamber and in another position the last said light device overlies another hexagonal container to direct the light into said other hexagonal container, whereby said hexagonal containers can be selectively exposed to said light from said light devices depending on the rotational position of said rotatable shafts to thereby provide for controlled repetition of lighted and non-lighted periods in said containers to thereby enhance the promotion of plant growth in said containers.

10. Plant cultivating apparatus according to claim 9, wherein one of said light source means is disposed such that the rotatable shaft of said one light source means is located at the center of the Y-shaped space formed by said first, second and third hexagonal containers, said one light source being movable into three rotatable positions such that the arm of said one light source overlies either said first, second or third hexagonal container.

11. Plant cultivating apparatus according to claim 9, wherein one of said light source means is disposed such that the rotatable shaft of said one light source means is located in the space between said first and second hexagonal containers, said one light source being movable into two rotatable positions such that the arm of said one light source overlies either said first or second hexagonal containers.

* * * * *